United States Patent [19]

Brettel et al.

[11] 4,452,083

[45] Jun. 5, 1984

[54] ULTRASONIC DIAGNOSIS DEVICE

[75] Inventors: Hans Brettel, Munich; Wolfgang Dietz, Eching; Ulrich Röder, Munich; Christof Scherg, Munich; Wilhelm Waidelich, Munich, all of Fed. Rep. of Germany

[73] Assignee: Gesellschaft für Strahlen- und Umweltforschung mbH, Neuherberg, Fed. Rep. of Germany

[21] Appl. No.: 404,910

[22] Filed: Aug. 3, 1982

[30] Foreign Application Priority Data

Sep. 4, 1981 [DE] Fed. Rep. of Germany ....... 3135053

[51] Int. Cl.³ .................. G01N 29/00; A61B 6/00
[52] U.S. Cl. .................. 73/607; 73/642; 73/644; 128/660
[58] Field of Search .................. 128/660; 73/607, 618, 73/642, 644; 367/150

[56] References Cited

U.S. PATENT DOCUMENTS

| | | | |
|---|---|---|---|
| 3,780,572 | 12/1973 | Rocha | 73/607 |
| 3,937,066 | 2/1976 | Green et al. | 73/607 |
| 3,959,770 | 5/1976 | Schaefer | 73/607 |
| 4,386,612 | 6/1983 | Roder et al. | 128/660 |

*Primary Examiner*—Howard A. Birmiel
*Attorney, Agent, or Firm*—Spencer & Frank

[57] ABSTRACT

In an ultrasonic diagnosis device composed of ultrasonic optical elements arranged to be disposed in a mass of fluid in a container together with the object to be examined in order to image the object in an image plane, a source of incoherent sound radiation for irradiating the object, a condenser lens, an imaging objective and an acoustic energy detector system, the incoherent sound radiation source is composed of a turbulence chamber containing a plurality of particles arranged to move essentially randomly relative to one another, and at least one ultrasonic transmitter for irradiating the particles in the turbulence chamber with coherent ultrasound; the imaging objective is composed of at least two individual lenses of homogeneous material which are arranged in symmetry to one another and each having lens face which faces the other lens and which has an aspherical shape; and the detector system is composed of a linear array of detectors for converting the resulting ultrasound image of the object into electrical signals, and a unit for periodically moving the detectors across the image plane.

11 Claims, 8 Drawing Figures

ULTRASONIC DIAGNOSIS DEVICE

BACKGROUND OF THE INVENTION

The present invention relates to an ultrasonic diagnosis device of the type in which the ultrasonic optical elements and the object at which the sound is directed are disposed in a liquid container and the image of the object is reproduced in one plane, the sound irradiation of the object takes place with incoherent sound radiation, and the device includes a condenser lens, an imaging objective and a detector system.

Conventional ultrasonic devices, for example, for medical diagnosis, operate according to the echo principle. In these devices, an electro-acoustic transducer head which, due to the piezoelectric ceramics contained therein, is able to transmit as well as receive, emits the shortest possible ultrasound pulse which is closely focussed in depth. Echoes are produced at body interfaces where acoustic impedance changes occur and these echoes are usually detected by the same acoustic head. The depth information is calculated from the travel time of the sound and scanning, which may be electronic or mechanical, produces a two-dimensional depth section image.

Ultrasonic diagnosis devices of the above-described type are disclosed, for example, in U.S. Pat. Nos. 3,913,061, 3,982,223 and 3,971,962.

These devices operate according to known imaging principles of the optical art, with ultrasonic or acoustic, lenses being used for the imaging. However, the design of these lenses requires that a special fluid, e.g. a fluorinated hydrocarbon, be enclosed between two polystyrene lenses, which results in high absorption losses in the special fluid and high reflection losses at the interfaces between the special fluid and the polystyrene. Moreover, within these imaging lenses, there are included prism systems which must be movably mounted in order to be able to deflect, or scan, the imaging beam. The generation of the incoherent acoustic field required for imaging is effected, for example, by means of 30 coherent individual ultrasound sources which are individually actuated and emit high intensity pulses. The detector device itself is composed of stationary detectors which must be arranged on a spherical surface.

SUMMARY OF THE INVENTION

It is an object of the present invention to provide an ultrasonic diagnosis device which permits high resolution ultrasonic imaging with the aid of acoustic lenses, thus realizing increased incoherence of the acoustic field, a simplified sound generator imaging unit, and better image quality.

The above and other objects are achieved, according to the invention, in an ultrasonic diagnosis device composed of ultrasonic optical elements arranged to be disposed in a mass of fluid in a container together with the object to be examined in order to image the object in an image plane, a source of incoherent sound radiation for irradiating the object, a condenser lens, an imaging objective and an acoustic energy detector system, in that:

the incoherent sound radiation source includes a turbulence chamber containing a plurality of particles arranged to move essentially randomly relative to one another, and at least one ultrasonic transmitter for irradiating the particles in the turbulence chamber with coherent ultrasound;

the imaging objective includes at least two individual lenses of homogeneous material which are arranged in symmetry to one another and each having a lens face which faces the other lens and which has an aspherical shape; and the detector system includes a linear array of detectors for converting the resulting ultrasound image of the object into electrical signals, and means for periodically moving the detectors across the image plane.

According to the present invention, use is made of a highly incoherent, diffuse ultrasound such as can be generated, for example, by means of a turbulence chamber of the type disclosed in copending U.S. application Ser. No. 308,938 filed by Ulrich Roder et al. on Oct. 5, 1981, now U.S. Pat. No. 4,386,612, thus avoiding the occurrence of artefacts due to blurred imaging of regions outside the focal plane. Imaging normally occurs in transmission; reflection operation is also possible, where the sound scattered in the interior of a patient is used for imaging. Transmitter and receiver are thus separate components and acoustic lenses produce images in the manner of radiographs. However, in addition to bones and joints, the image also includes soft tissue, muscles, vessels and tendons. use for material testing is likewise possible.

A device of the above type suitable for clinical use of the widest variety includes, for example, a large basin of water in which the detector unit is permanently installed, with the transmitter unit being adjustable by means of a lifting crane to most favorably direct the sound onto the patient. The imaging objective is arranged to be displaceable at a suitable distance in front of the detector.

To create a compact device which does not require partial immersion of the patient in water, flexible plastic foils are used, for example, as is presently the custom, to couple the ultrasound to the patient and to define, in the direction toward the patient, the boundary of the transmitting and receiving unit which is embedded in a suitable liquid.

DESCRIPTION OF THE PREFERRED EMBODIMENTS

Figure 1:
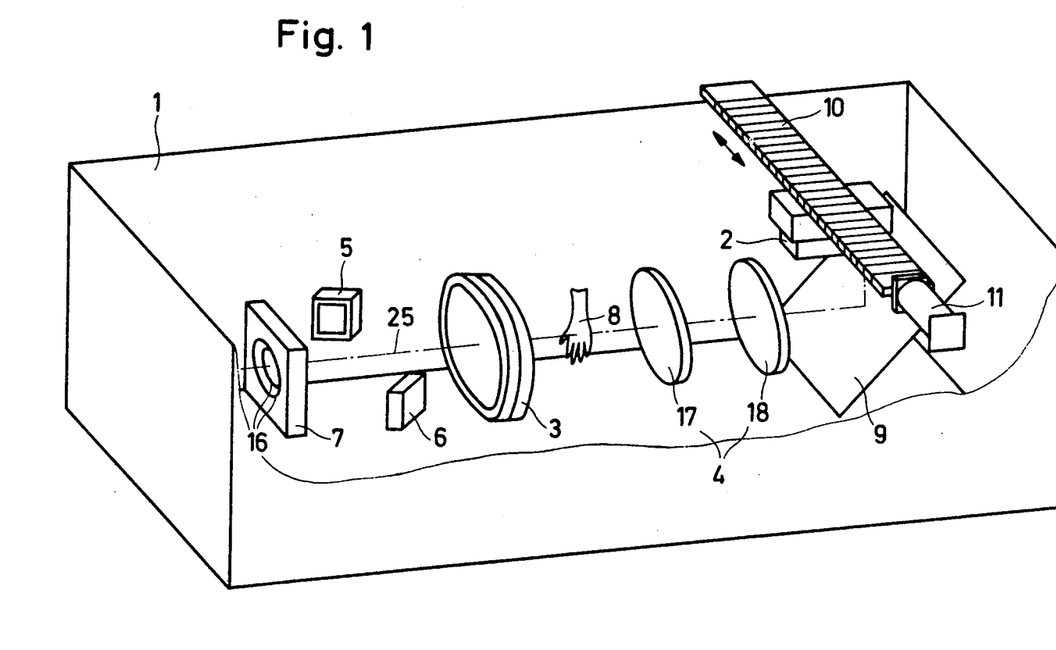
FIG. 1 is a perspective view of an embodiment of an ultrasonic diagnosis device according to the invention.

FIG. 1 is a schematic representation of an ultrasonic diagnosis device according to the invention. In a large vessel 1 which is filled, for example, with water, the entire sound radiating and imaging system is immersed under water. The detector device 2 also is in contact with the surface of the water. The patient, or the object, 8 to be irradiated with sound, or insonified, is disposed between a condenser lens 3 and an imaging lens unit 4 of the radiating and imaging system. Two acoustic signal emitters 5 and 6 direct the spatially coherent sound radiation which they produce toward a turbulence chamber 7 containing a large number of particles which generate an initial incoherent acoustic field. This field is used to irradiate the object 8 in transmission, or also in reflection.

The ultrasound radiation emanating from the object 8 passes through the imaging objective unit 4 and is reflected at an ultrasound mirror 9 disposed at an angle thereto onto the detector device 2. This detector device 2 is supported from a displaceable table 10 and can be moved by means of a motor 11 in the linear direction illustrated by a double arrow.

Figure 2:
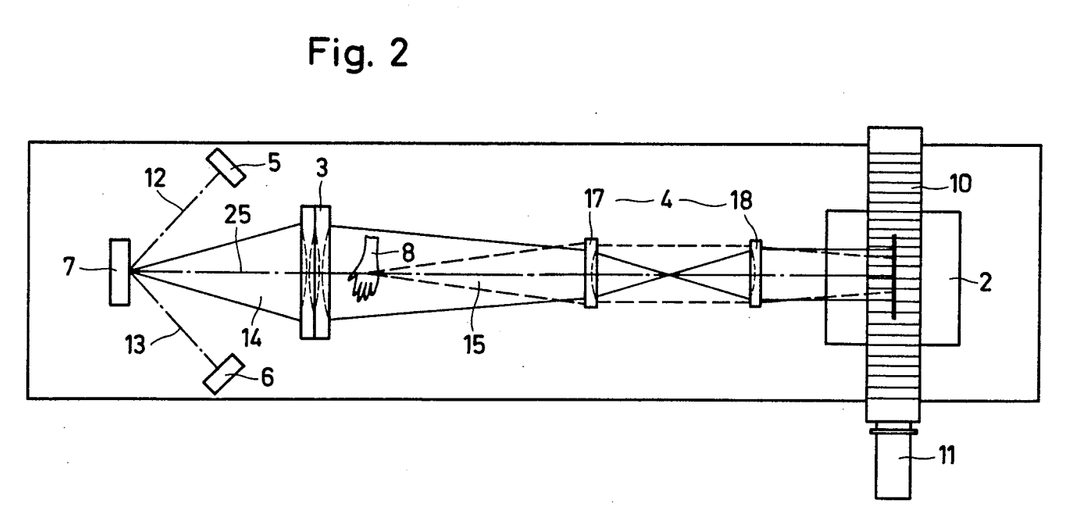
FIG. 2 is a top plan view of the device of FIG. 1.

FIG. 2 is a top view of the ultrasound diagnosis device of FIG. 1 and shows spatially coherent, primary acoustic waves 12 and 13 which emanate from the two emitters 5 and 6 and are directed toward the turbulence chamber 7. The resulting incoherent ultrasound 14 reflected by the particles in the turbulence chamber 7 is directed by condenser lens 3, whose configuration is indicated, toward the object 8. The radiation path of the transmitted radiation 15, or of the radiation scattered in the object 8, through the imaging objective unit 4 to the detector device 2 is likewise indicated.

Figure 3:
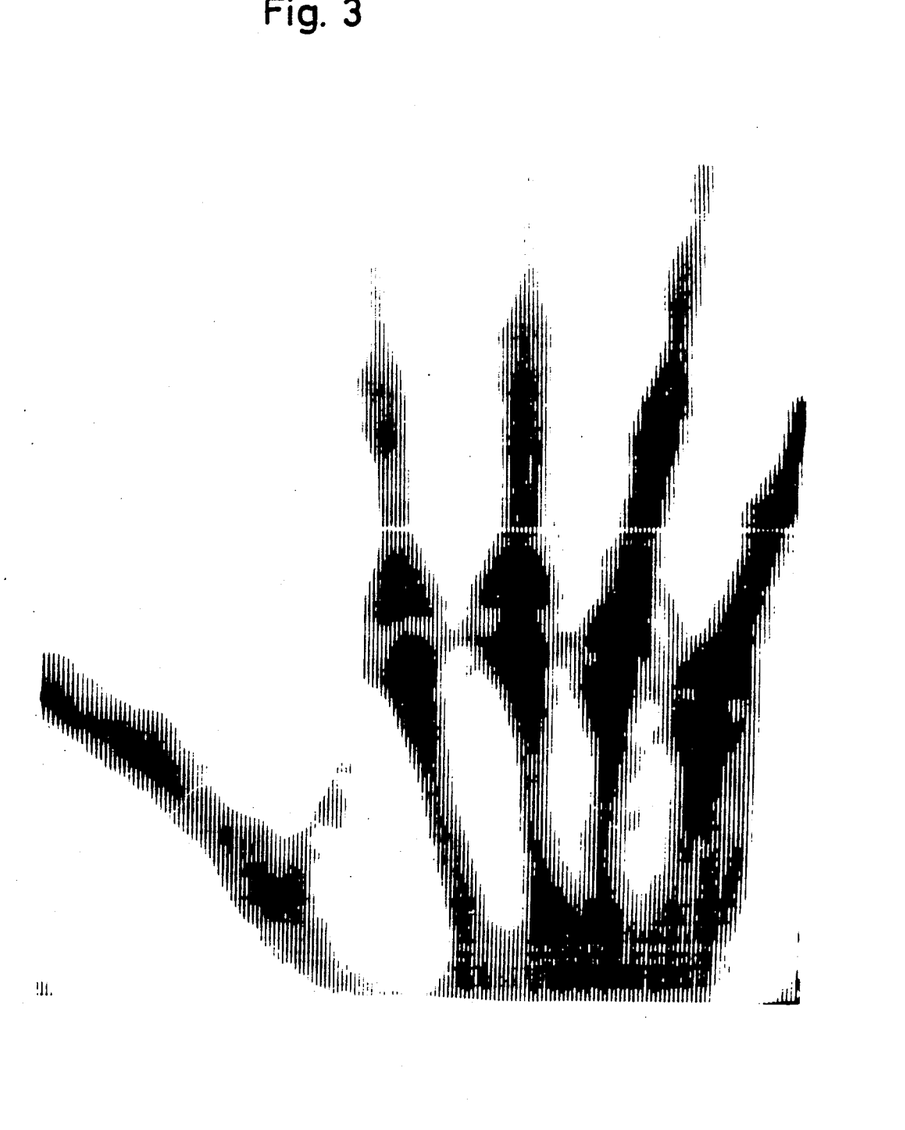
FIG. 3 is a reproduction of an image produced by the device of FIGS. 1 and 2.

FIG. 3 is a photographic reproduction of the image of a human hand, i.e. object 8, as it can be created with the ultrasound diagnosis device according to FIGS. 1 and 2.

The incoherent turbulence chamber 7 can be constructed in the manner disclosed in the above-cited copending U.S. Application Ser. No. 308,938 wherein coherent sound radiation 12, 13 is diffusely scattered at small particles in the turbulence chamber 7.

For the present ultrasound diagnosis device it was found to be most favorable to operate the turbulence chamber 7 according to the reflected light optical principle. For this purpose, chamber 7 is provided with a polystyrene window 16 facing lens 3 (see FIG. 1) and is irradiated with one or a plurality of primary coherent acoustic waves 12, 13. The resulting ultrasonic field 14 scattered back by the randomly moving particles in chamber 7 (not shown) can leave through the same window 16. The ultrasonic emission 14 is diffuse and incoherent and is utilized to irradiate the patient with sound.

Air-filled or solid glass balls are preferably used instead of polystyrene particles as the scattering particles since the back scattering of the primary ultrasonic waves 12, 13 is then significantly reinforced by the great difference in impedance between those balls and water. To shorten the coherence time of the back scattered ultrasound field 14, the frequency of the primary ultrasonic waves 12 and 13 is continuously varied around its center frequency over the bandwidth of the transmitters 5, 6. Actually a center frequency of 2 MHz is used and frequency variation is in the range of ±200 kHz.

The secondary, scattered wave field containing a primary wave of fixed frequency has an impressed granulation pattern which orginates from interference of the many scattered elemental waves. The uncoordinated movement of the scattering particles in the turbulence chamber 7 produces a likewise uncoordinated movement of this granulation pattern and, if there is a sufficient time integration in the detector member 2, this undesirable coherent interference is blurred and suppressed. Since the granulation pattern is also frequency specific, an additional change in frequency in the range of the resonant curve of the piezoelectric sound oscillator (transmitter 5, 6) either improves the suppression of the granulation pattern or makes possible a shorter integration time for the detector 2.

Actually a frequency modulation of 2 MHz ±200 kHz is done at a rate of 100 μs/cycle.

The imaging unit 4 includes two ultrasonic lenses 17 and 18 with which an acoustic radiation image of the region 8 to be examined is generated. With this type of imaging only a relatively small depth region of a few centimeters is focussed on at any one time. Structures barely outside the focussed depth region are already imaged out of focus and with increasing distance produce less and less contrast and thus do not contribute to the resulting image.

In order to produce well focussed ultrasonic images, the most severe imaging errors, such as curvature of the image field and aperture errors, are corrected in the acoustic lens unit 4 described here below. This unit, illustrated in FIGS. 4 and 5, requires only two identical, simple, plano-concave polystyrene lenses 17 and 18. This avoids high absorption losses in a special fluid and high reflection losses at interfaces between the special fluid and polystyrene. On the other hand, the precision requirements for the lens faces are not too high because the ratio of the indices of refraction at the interfaces is smaller.

Figure 4:
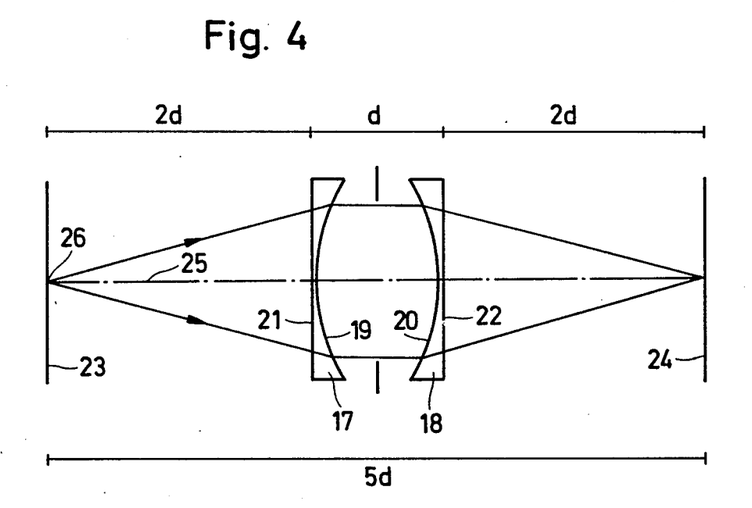
FIGS. 4 and 5 are pictorial views of a lens system according to the invention.
Figure 5:
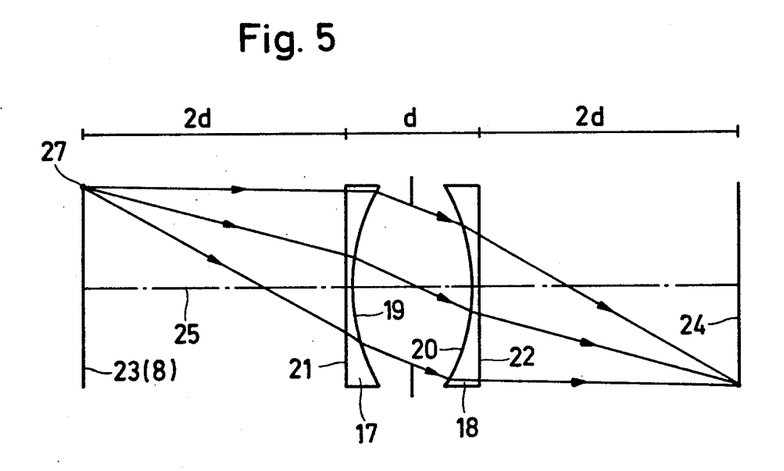

To correct aperture errors, the concave faces 19 and 20 of the polystyrene lenses 17 and 18 are shaped according to a specially adapted aspherical element of the fourth order. Correction of the image field curvature then results, on the one hand, from the shape of this aspherical element and, on the other hand, from the distance d between the two polystyrene lenses 17, 18. The distance between the object plane 23, coinciding with the location of the object to be examined, and the image plane 24 is about 5 d for a one by one magnification.

It is important for a successful design that the planar faces 21 and 22 of the lenses are oriented outwardly of the region enclosed by the lenses, face 21 being directed toward plane 23 and face 22 being directed toward plane 24, while the two aspherical faces 19 and 20 face one another. In this arrangement, the aspherical faces 19 and 20 for correcting the aperture error are each somewhat similar to a hyperbola and are not elliptical as in the inverse case when the planar lens faces face one another.

Because of the hyperbola-like surfaces, the central part of the sound waves emanating from an object point 26 near the axis 25 of the lens system passes through the more extensively curved regions of the aspheric faces 19 and 20, as depicted in FIG. 4, while the central part of the sound waves emanating from object points 27 more remote from the axis 25 passes through one of the aspheric members 19 or 20 in a less curved region and thus produce an image at a greater axial spacing as required for compensating the curvature of the image plane.

However, because of the planar faces 21 and 22 facing the object 8, or plane 23 and the image plane 24, respectively, each aspherical surface 19 and 20 must not have the shape of a hyperbola but must be modified somewhat so as to compensate the aperture error produced by the planar faces 21 and 22.

For a calculation of the shape of the aspherical faces 19 and 20, the ideal asphere of an interface between two media is determined for an accurate point-by-point reproduction of points on the axis of rotation 25. In this manner of calculation, the one borderline case with planar waves in a medium having a low sound propagation speed just furnishes a hyperboloid while the other borderline case with an infinitely removed point, i.e. planar waves on the side of the higher speed of sound, furnishes an ellipsoid. The necessary hyperbola-like aspherical shapes for faces 19 and 20 then result for points farther remote in a medium having a lower speed of sound.

According to the design principles disclosed above the aspherical surfaces 19 and 20 are optimized by computer aided design applying ray tracing methods.

A further advantage is that the lens correction effected in this manner is also effective if the temperature in the diagnosis basin 1 is changed, which is known to result in a change of the index of refraction. To realize a good image, it is only necessary to correspondingly vary the distance between object 8 and planar surface 21 or between the planar surface 22 and the image plane 24, respectively. On the other hand, the procedure can be reversed and the desired object or image plane distance can be achieved by varying the temperature or the speed of sound, which varies depending on the type of polystyrene employed and on the manner of manufacturing the blank, can be adapted to the already calculated aspherical member.

To produce the aspherical faces 19 and 20 it is advisable to initially calculate the coordinates of a meridional section through the aspherical face and to display it graphically. From this graphical display, it is already possible to machine a roughly shaped steel member and this member can then be worked on a cutting machine according to the derived coordinates. The resulting special steel member can then be used to mold the polystyrene blank directly or to produce a casting mold mask.

Figure 7:
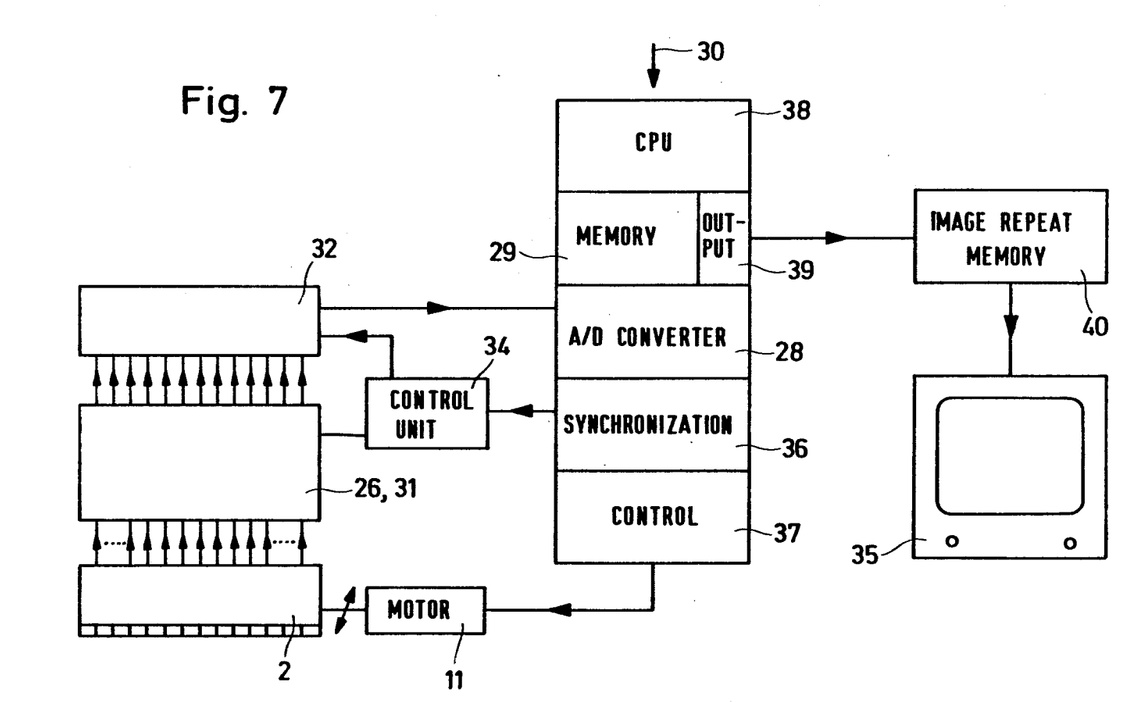
FIG. 7 is a block circuit diagram of the complete detector arrangement.

Reverting to FIGS. 1 and 2, the detector unit 2 includes a linear piezoelectric receiving transducer array and an electronic preprocessing system which senses the sound pressure levels at the array elements and preprocesses the transducer outputs for further processing in a microcomputer 30, shown in FIG. 7. In order to be able to record a two-dimensional ultrasonic image, this one-dimensional array 2 must be moved mechanically line by line over the acoustic field, by means of displacement table 10 and motor 11, and the information associated with each line must be stored.

To increase the scanning speed, two or more arrays 2 can be arranged in juxtaposition so that only a movement over half the image surface 24 is required to record an image, or if there are more than two arrays only a correspondingly smaller part of the image surface 24 need be scanned.

The one-dimensional array or arrays 2 are moved either linearly, i.e. in translation, so that the image is constructed line by line as in a television picture, or, in another embodiment, circularly, where the array is rotated around its center or end point.

In this second case the image is constructed, as in the radar art, of radial image lines.

Due to its continuous movement, without reversing direction, the rotating array movement permits an even higher scanning speed. Even with rotating movement, the use of a plurality of arrays which are arranged at different angles can result in faster image assembly at the same rpm.

Figure 6:
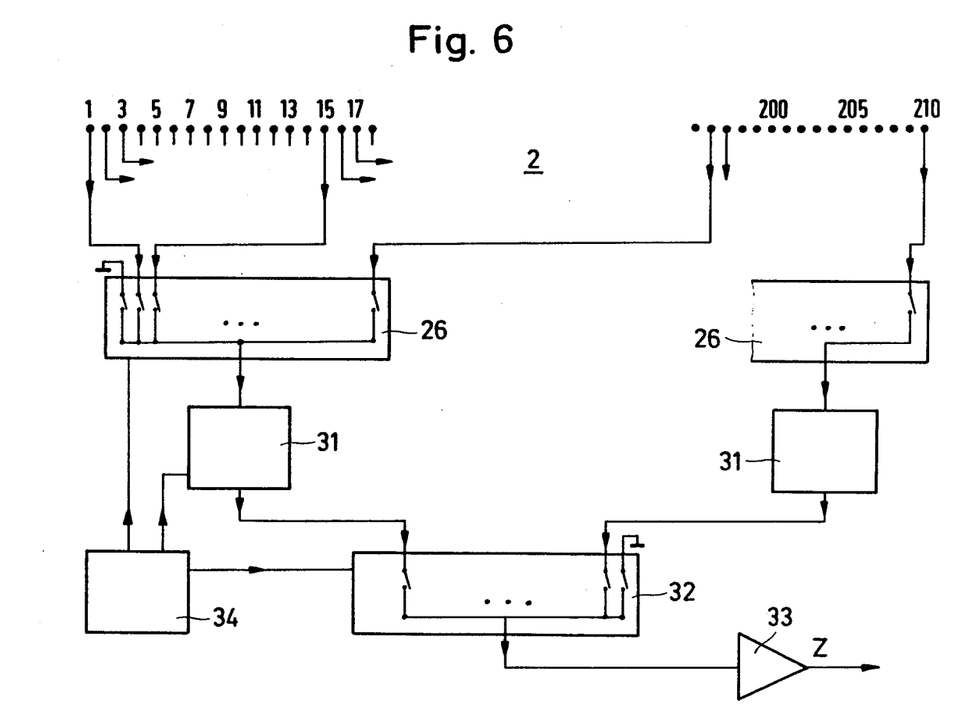
FIG. 6 is a block circuit diagram of a component of a detector arrangement of a device according to the invention.

FIG. 6 is a block circuit diagram for an electronic preprocessing system associated with a linear transducer array 2 having 210 elements 1–210 and FIG. 7 is a block circuit diagram for an entire detector arrangement.

FIG. 6 shows the 210 array elements of the detector device 2 which are divided into 15 groups each composed of 14 transducers. The signal from respective 1st, 2nd, 3rd, 4th, 5th, 6th, 7th, 8th, 9th, 10th, 11th, 12th, 13th, or 14th transducer of each of the 15 groups is fed in succession through a respective multiplexer 26 to a respective channel 31. Thus transducers 1, 15 . . . 197 are connected to a first multiplexer, transducer 2, 16 . . . 198 are connected to the next multiplexer and transducers 14, 28 . . . 210 are connected to the last multiplexer.

Figure 8:
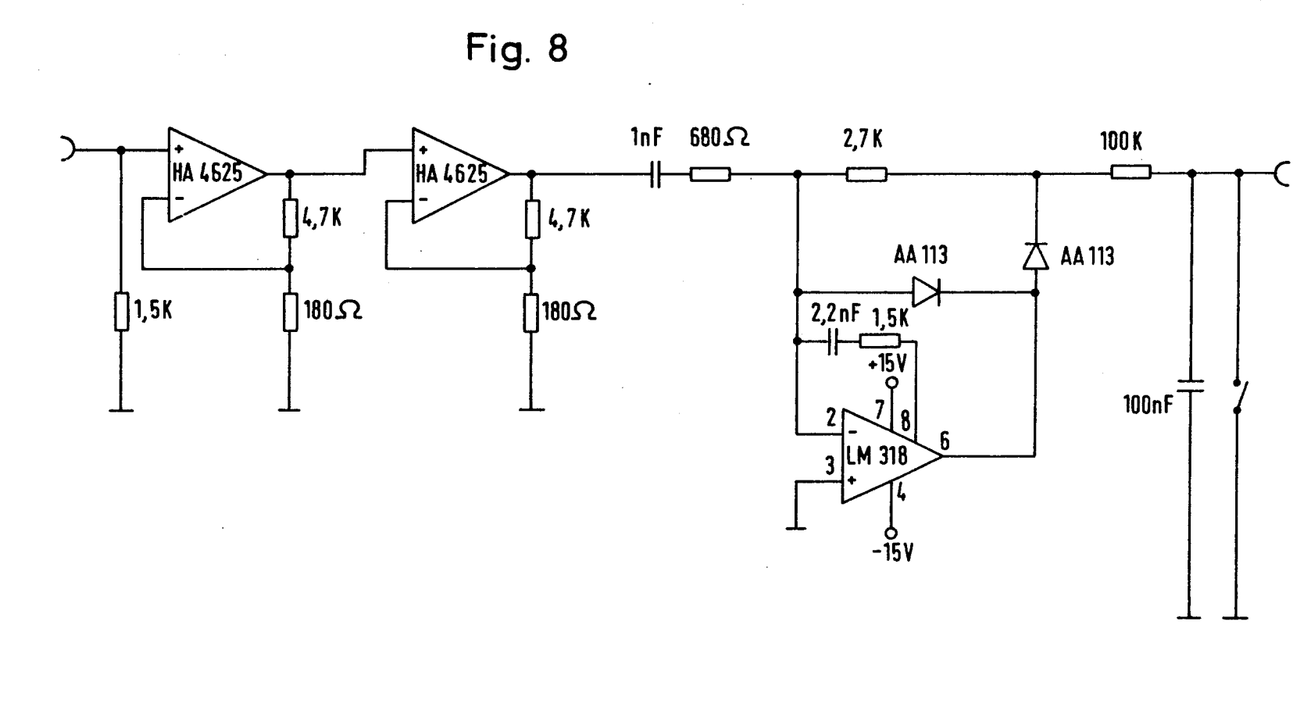
FIG. 8 shows an example for the preamplification, rectification and time integration part of one signal channel.

In each one of these channels 31 (one of them is shown in FIG. 8), the HF signals are preamplified, rectified and integrated. The respective integrated end values successively reach a multiplexer 32 common for all 14 channels 31 and a matching amplifier (see FIG. 7) of the microcomputer 30. The switching of the multiplexers 26 and 32 and the resetting of the integrators in the 14 channels 31 is effected by means of the control unit 34.

The block circuit diagram of FIG. 7 shows the preprocessing HF channels of FIG. 6 linked to the microcomputer 30 and a monitor display 35. Microcomputer 30 includes, in addition to an A/D converter 28, an operating memory 29, a synchronization unit 36 for the multiplex control 34, a control 37 for the motor 11 and a central processing unit 38. The image values determined by the microcomputer are fed to the monitor 35 via an output interface 39 and an image repeat memory 40.

In order to provide an indication of the sound level at one element of the piezoelectric array 2, the weak HF alternating voltage furnished by the piezoeffect is, in each channel 31, initially amplified by means of a sensitive pre-amplifier, rectified and summed in analog form over a long period of time which must be long compared to the coherence time of the sound. Thus the mean time value is determined for the acoustic pressure level of each image element and then the values are collected, element for element, via the analog/digital converter 28, in the memory 29 of the microcomputer 30. Since, due to the coherence time of the sound source, integration requires a time of the order of magnitude of 1 ms, but it is desirable, on the other hand, to produce an image having 200×200 image points in an acceptable period of time, preamplification, rectification and summing are performed in the 14 parallel channels 31 so that the mean values can be interrogated from channel to channel at greater speed.

The electronic circuit shown in FIG. 6 is a mixture of electronic parallel connections and multiplex connections which, due to their 14 parallel channels 31, has a summing period corresponding to the interrogation period for the other 13 channels. The illustrated solution is designed for interrogation of 210 elements and brings with it, compared to a pure, single-channel electronic multiplex system and with the same averaging time per image point, an increase in the playback speed by a factor of 13. Although, compared to a purely parallel electronic system having 210 parallel channels, the illustrated circuit is slower, it is also considerably less expensive and simpler to tune.

In scientifically produced arrays 2 with electronic control it is unavoidable that the individual elements deviate somewhat from one another with respect to their sensitivity characteristics.

By using digital electronic techniques to process the detector signals and employing the digital video image repeat memory 40, these drawbacks can be overcome.

First, the sensitivity characteristics of all detector elements are measured fully automatically in the acoustic field without an object 8 present and these values are stored in the form of tables.

During the imaging of an object 8 to be examined, each detector signal is constantly corrected via the stored value table and thus the differences in response behavior of the individual detector elements and the preamplifier, rectifier and integrator of each channel 31 are compensated. At the same time this technique automatically compensates for irregularities of sound irradiation in a rotating detector.

The automatic recording of the detector characteristics is effected under the control of the computer 30, with the device adjusted for the measurement, but with a free beam path, i.e. without an object 8 to be examined.

To measure the characteristics, the amplitude of the signal generators driving the sound transmitters 5 and 6 is increased in steps, the detector line 2 is read out at each step and the respective set of values is stored.

In this connection it was found to be advisable to read out the detector line 2 several times at each intensity stage and to average the signals from each detector element. In this way the incoherence characteristics of the ultrasound sources 5 and 6 are fully utilized and thus the measured sensitivity curves are more accurate.

The CPU of the computer system 30 is a LSI-11/23 (Digital Equipment Corp.) provided with the appropriate Q-Bus interfaces.

It will be understood that the above description of the present invention is susceptible to various modifications, changes and adaptations and the same are intended to be comprehended within the meaning and range of equivalents of the appended claims.

What is claimed is:

1. In an ultrasonic diagnosis device composed of ultrasonic optical elements arranged to be disposed in a mass of fluid in a container together with the object to be examined in order to image the object in an image plane, a source of incoherent sound radiation for irradiating the object, a condenser lens, an imaging objective and an acoustic energy detector system, the improvement wherein:

said incoherent sound radiation source comprises a turbulence chamber containing a plurality of particles arranged to move essentially randomly relative to one another, and at least one ultrasonic transmitter for irradiating the particles in said turbulence chamber with coherent ultrasound;

said imaging objective comprises at least two individual lenses of homogeneous material which are arranged in symmetry to one another and each having one lens face which faces the other said lens and which has an aspherical shape; and said detector system comprises a linear array of detectors for converting the resulting ultrasound image of the object into electrical signals, and means for periodically moving the detectors across the image plane.

2. Ultrasonic diagnosis device as defined in claim 1 wherein said ultrasonic transmitter comprises means for varying the coherent ultrasound emitted by said transmitter in time by frequency and/or amplitude modulation.

3. Ultrasonic diagnosis device as defined in claim 1 or 2 wherein said particles in said turbulence chamber are small, air filled glass balls or solid glass beads.

4. Ultrasonic diagnosis device as defined in claim 1 or 2 wherein the object to be examined is irradiated by acoustic radiation transmitted through or reflected from said chamber.

5. Ultrasonic diagnosis device as defined in claim 1 or 2 wherein each said lens face which faces the other said lens is designed to be aspherical in the fourth order and the distance between the centers of said aspherical faces is about 1/5 of the distance between the object and said image plane.

6. Ultrasonic diagnosis device as defined in claim 1 or 2 wherein each said individual lens is made of polystyrene.

7. Ultrasonic diagnosis device as defined in claim 1 or 2 wherein the other lens face of each said individual lens has a radius of curvature in the range between a value which is significantly larger than the radius of curvature at the peak of said one lens face of each said lens and infinity.

8. Ultrasonic diagnosis device as defined in claim 1 or 2 wherein said array of detectors comprises individual, linearly arranged piezoelectric detectors.

9. Ultrasonic diagnosis device as defined in claim 1 or 2 wherein each said detector emits an HF electrical signal in response to sound radiation incident thereon, and said detector system comprises means defining a plurality of signal processing channels connected to said detectors for preamplifying, rectifying and integrating the signal from each detector in such a manner that the averaging time required per image point in the image plane in order to record incoherent ultrasound images, is maintained when a high scanning rate is employed.

10. Ultrasonic diagnosis device as defined in claim 9 wherein said detector system further comprises means for storing the sensitivity characteristics of each said channel by varying the sound radiation intensity and simultaneously recording the respective detector signals.

11. Ultrasonic diagnosis device as defined in claim 10 wherein said detector system further comprises means operative during the recording of an image for compensating differences in response behavior between said detectors by immediate electronic correction on the basis of the stored sensitivity characteristics.

* * * * *